United States Patent
Wehling et al.

(10) Patent No.: US 9,910,142 B2
(45) Date of Patent: Mar. 6, 2018

(54) ULTRASONIC SENSOR DEVICE COMPRISING A REINFORCEMENT HOLDER, ARRANGEMENT, MOTOR VEHICLE AND CORRESPONDING METHOD

(71) Applicant: Valeo Schalter Und Sensoren GmbH, Bietigheim-Bissingen (DE)

(72) Inventors: Hans Wilhelm Wehling, Heilbronn (DE); Joerg Weyland, Brackenheim (DE); Hubert Neft, Grossbottwar (DE); Oliver Eidel, Moglingen (DE); Stephan Max, Gifhorn (DE)

(73) Assignee: Valeo Schalter Und Sensoren GmbH, Bietigheim-Bissingen (DE)

( * ) Notice: Subject to any disclaimer, the term of this patent is extended or adjusted under 35 U.S.C. 154(b) by 238 days.

(21) Appl. No.: 14/416,068

(22) PCT Filed: Jul. 23, 2013

(86) PCT No.: PCT/EP2013/065515
§ 371 (c)(1),
(2) Date: Jan. 21, 2015

(87) PCT Pub. No.: WO2014/016298
PCT Pub. Date: Jan. 30, 2014

(65) Prior Publication Data
US 2015/0198698 A1 Jul. 16, 2015

(30) Foreign Application Priority Data
Jul. 24, 2012 (DE) .................. 10 2012 106 697

(51) Int. Cl.
*G01S 15/08* (2006.01)
*H04R 1/02* (2006.01)
(Continued)

(52) U.S. Cl.
CPC .............. *G01S 7/521* (2013.01); *G01S 15/08* (2013.01); *H04R 1/021* (2013.01); *G01S 15/931* (2013.01);
(Continued)

(58) Field of Classification Search
CPC ........ G01S 7/521; G01S 15/08; G01S 15/931; G01S 2015/938; H04R 1/021; H04R 7/16;
(Continued)

(56) References Cited

U.S. PATENT DOCUMENTS 7,518,491 B2 * 4/2009 Oda .................. G01S 7/521
340/436
7,929,377 B2 * 4/2011 Wehling .................. G10K 9/22
367/140
(Continued)

FOREIGN PATENT DOCUMENTS

DE 42 38 924 A1 5/1994
DE 10 2006 008 718 A1 8/2007
(Continued)

OTHER PUBLICATIONS

International Preliminary Report on Patentability (Chapter I of the Patent Cooperation Treaty) for International Application No. PCT/EP2013/065515, filed Jul. 23, 2013, Valeo Schalter Und Sensoren GmbH.

*Primary Examiner* — J M Saint Surin
(74) *Attorney, Agent, or Firm* — Louis Isaf; Womble Bond Dickinson (US) LLP

(57) ABSTRACT

The invention relates to an ultrasonic sensor device (1) for a motor vehicle, comprising ultrasonic sensor (7) which comprises a pot-shaped membrane (6) for emitting and/or receiving ultrasonic signals as well as a sensor housing (10), comprising a stiffening element (3) arranged around the
(Continued)

membrane (6) and comprising a holder (4), which is designed for holding the sensor housing (10) on a back side of a trim element of the motor vehicle, wherein the stiffening element (3) and the holder (4) are designed to be integrally formed from a uniform material.

15 Claims, 3 Drawing Sheets

(51) Int. Cl.
*G01S 7/521* (2006.01)
*G01S 15/93* (2006.01)
*G10K 11/16* (2006.01)
*H04R 7/16* (2006.01)
*G10K 11/00* (2006.01)

(52) U.S. Cl.
CPC ...... *G01S 2015/938* (2013.01); *G10K 11/004* (2013.01); *G10K 11/16* (2013.01); *H04R 7/16* (2013.01); *H04R 2499/13* (2013.01); *Y10T 29/49016* (2015.01)

(58) Field of Classification Search
CPC .. H04R 2499/13; G10K 11/16; G10K 11/004; Y10T 29/49016
USPC .......................................................... 73/632
See application file for complete search history.

(56) References Cited

U.S. PATENT DOCUMENTS

| | | | |
|---|---|---|---|
| 8,125,321 B2 | 2/2012 | Korjima et al. | |
| 8,587,182 B2* | 11/2013 | Reiche | H04R 31/00 |
| | | | 310/322 |
| 8,596,139 B2 | 12/2013 | Mueller et al. | |
| 8,973,442 B2* | 3/2015 | Schneider | G10K 11/004 |
| | | | 367/140 |
| 2015/0185188 A1* | 7/2015 | Eidel | G01S 15/931 |
| | | | 73/617 |
| 2015/0192673 A1* | 7/2015 | Wehling | B60R 19/483 |
| | | | 367/138 |

FOREIGN PATENT DOCUMENTS

| | | |
|---|---|---|
| DE | 10 2007 045 809 A1 | 6/2008 |
| DE | 10 2008 018 110 A1 | 10/2008 |
| DE | 10 2008 055 126 A1 | 7/2010 |
| DE | 10 2010 044 996 A1 | 3/2012 |
| DE | 2010049818 A1 * | 3/2012 |
| DE | 10 2010 049 818 A1 | 5/2012 |
| DE | 10 2010 049 820 A1 | 5/2012 |
| DE | 10 2011 105 047 A1 | 12/2012 |
| DE | 10 2011 105 051 A1 | 12/2012 |
| GB | 2 272 819 A | 5/1994 |
| WO | WO 2009/144545 A1 | 12/2009 |
| WO | WO2012175480 * | 12/2012 |

* cited by examiner

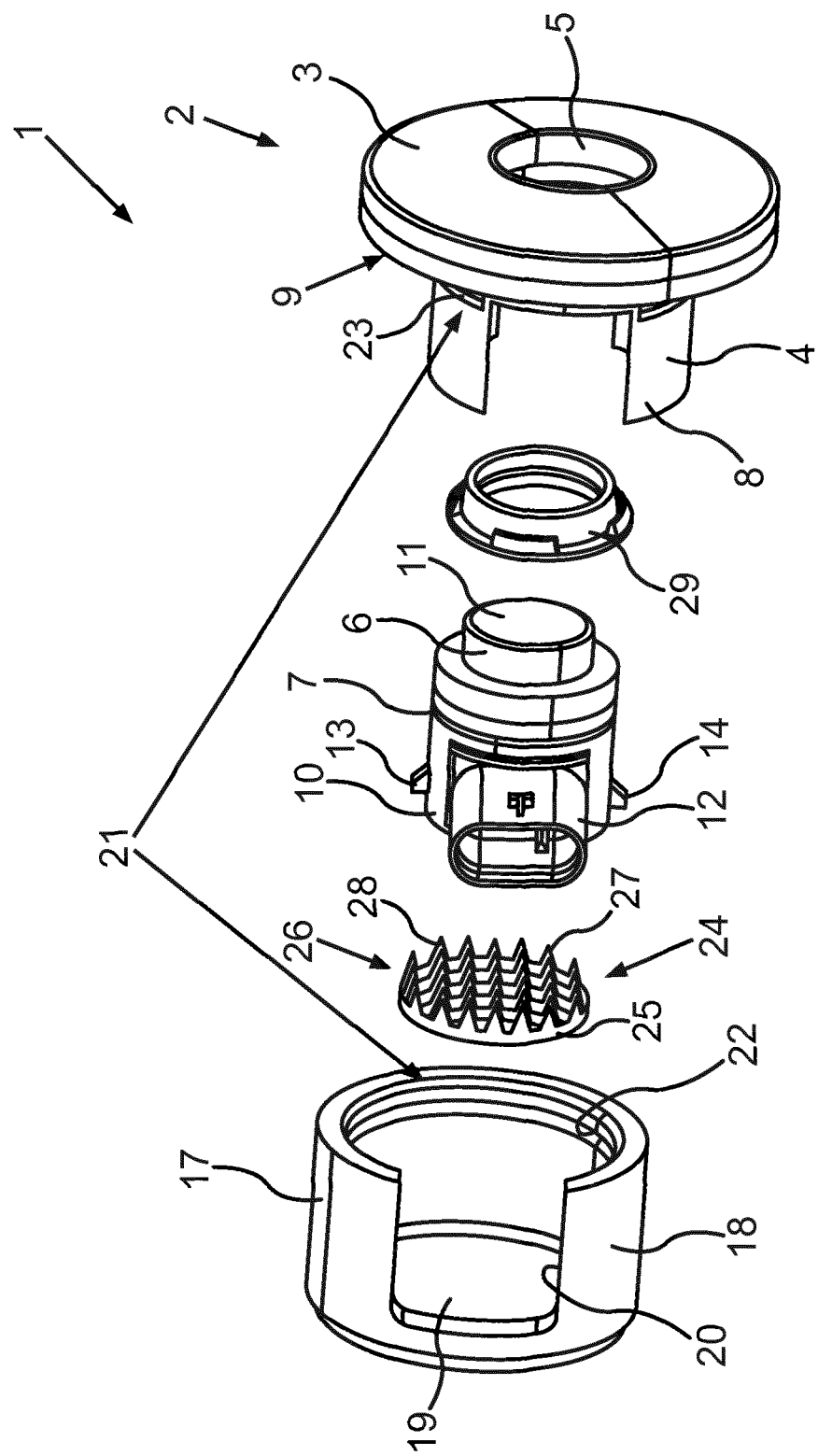

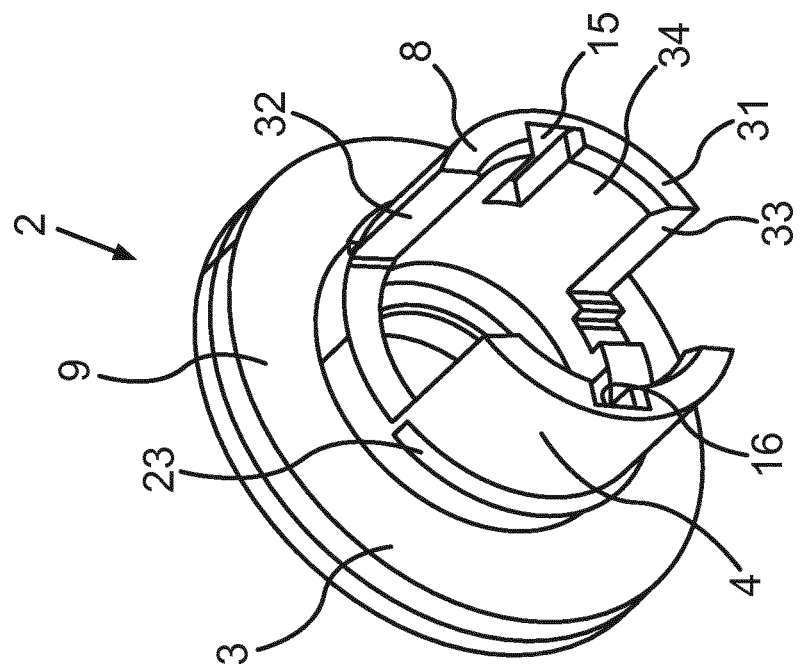
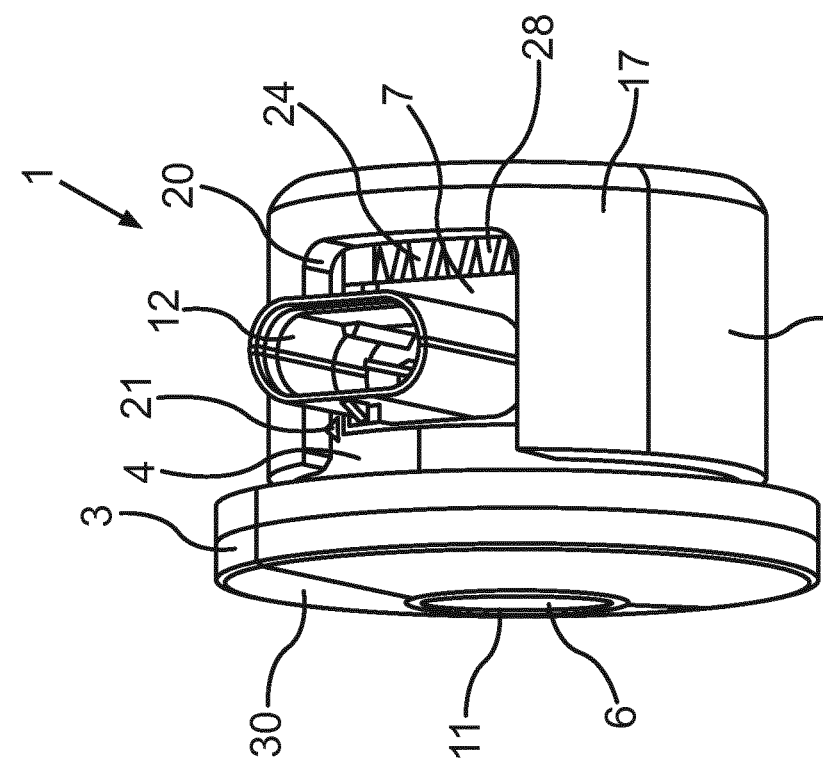

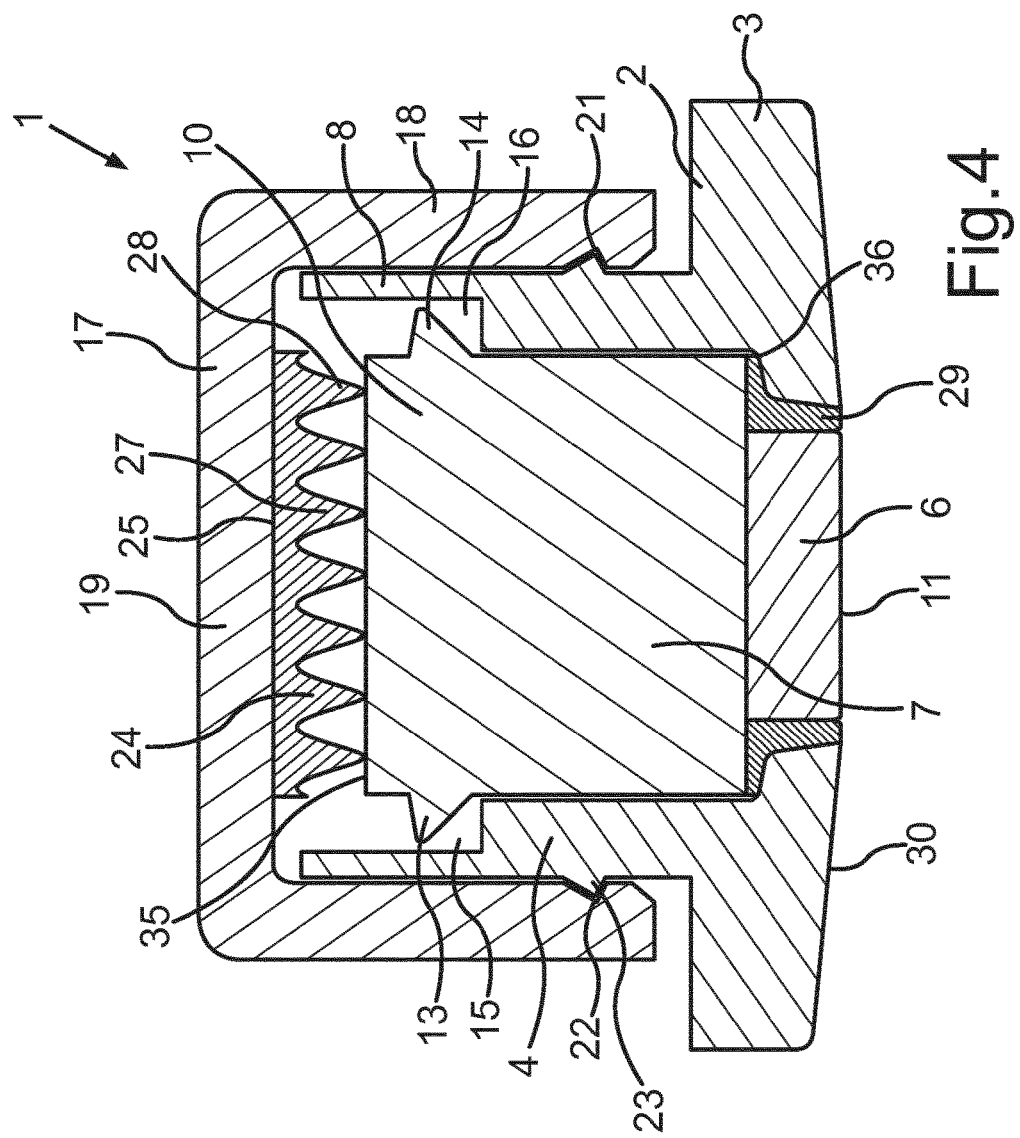

ULTRASONIC SENSOR DEVICE COMPRISING A REINFORCEMENT HOLDER, ARRANGEMENT, MOTOR VEHICLE AND CORRESPONDING METHOD

The invention relates to an ultrasonic sensor device for a motor vehicle, comprising an ultrasonic sensor, which comprises a pot-shaped membrane for emitting and/or receiving ultrasonic sensor signals as well as a sensor housing, and comprising a stiffening element arranged around the membrane, as well as a holder, which is designed for holding the sensor housing and thus the entire ultrasonic sensor on the back side of a trim element of the motor vehicle. The invention moreover relates to an arrangement comprising such a device, a motor vehicle comprising such an arrangement, as well as a method for manufacturing an ultrasonic sensor device for a motor vehicle.

Ultrasonic sensors are already prior art and can be mounted in known manner in the front region and in the rear region of the motor vehicle, namely for instance at the bumpers. The ultrasonic sensors are assigned to driver assistance devices and provide information about the environment of the vehicle, and more precisely about the distances between the vehicle, on the one hand, and the obstacles present in its environment, on the other hand. Driver assistance devices in this connection may be for instance parking assistance systems, systems for dead angle monitoring, headway control systems, braking assistance systems, and the like.

It is already known that such ultrasonic sensors are built into bumpers in uncovered arrangement. This means that they are arranged in open recesses or through-holes within the bumper and are visible on the outside. Here the pot-shaped membrane of the ultrasonic sensor—the so-called aluminium pot—extends through the through-hole of the bumper so that a front side or front surface of the membrane is flush with the outer surface of the bumper.

Presently, however, the focus is on a covered arrangement of an ultrasonic sensor, as it is for instance known from the document DE 42 38 924 A1 or else from the document DE 10 2008 018 110 A1. In such a hidden arrangement the ultrasonic sensor is arranged to be covered behind the bumper so that the front surface of the membrane is in contact with a back side of the bumper and the ultrasonic waves thus are emitted and received through the material of the bumper. Here a suitable holder needs to be employed in order to be able to fasten the membrane or the entire ultrasonic sensor including the membrane on the back side of the bumper.

In the case of the covered ultrasonic sensors the front side of the membrane is brought into contact with the back side of the bumper—possibly via a mounting lid—so that the ultrasonic signals are emitted and received through the material of the bumper. For holding the ultrasonic sensor on the back side of the bumper a holder is employed by which the ultrasonic sensor is capable of being connected in a non-destructive reversibly releasable manner. The holder is connected with the back side of the bumper via a adhesive connection or by using a glue. Thus, it is achieved that the ultrasonic sensor can be alone demounted without the holder and for instance be exchanged by simply releasing the connection between the ultrasonic sensor and the holder. In the case of covered ultrasonic sensors moreover for instance a stiffening element formed from ceramic is required so that the vibrations of the bumper can be kept local, as it is described in document DE 42 38 924 A1. In the case of such a concealed arrangement of the ultrasonic sensor behind the bumper, however, a particular challenge consists in preventing ultrasonic waves from spreading backwards and thus reducing the energy of the echo to a minimum. This is because if a certain portion of the sound energy is emitted backwards—i.e. in the direction of the interior of the vehicle—this ultrasound is reflected by the vehicle body and returns to the ultrasonic sensor as pseudo echo, which in turn may lead to fake targets.

It is the task of the present invention to provide a solution as how to reduce the echo in an ultrasonic sensor device of the initially mentioned kind in comparison with the prior art.

According to the invention this task is solved by an ultrasonic sensor device, by an arrangement, by a motor vehicle, in particular a passenger car, and by a method having the features according to the respective independent patent claims. Advantageous embodiments of the invention are subject matter of the dependent patent claims, the description, and the figures.

According to the invention an ultrasonic sensor device for a motor vehicle comprises an ultrasonic sensor with a pot-shaped membrane for emitting and/or receiving ultrasonic signals and with a sensor housing, as well as a stiffening element arranged around the membrane, which serves in particular for delimiting the vibration, as well as a holder, which is configured for holding the sensor housing on a back side of the trim element—for instance a bumper—of the motor vehicle. The sensor housing in this connection is in particular connected with the holder in a non-destructive reversibly releasable manner. According to the invention it is envisaged that the stiffening element and the holder are integrally formed.

The effect according to the invention consequently is achieved in that the holder serves for holding or fastening the ultrasonic sensor on the trim element is integrally formed with the stiffening element. Thus, on the whole a stiffening element is created which additionally adopts the function of the holding element of the ultrasonic sensor. By such a stiffening element it is achieved to considerably reduce the portion of the ultrasonic signals or the echo emitted backwards in comparison with the prior art so that also pseudo echoes and fake targets can be avoided. The invention in this connection is based on the insight that such a holder commonly is connected with the sensor housing, through which—in particular in the region of the membrane—a certain portion of the ultrasonic energy is radiated backwards, which now is prevented by the fact that the holder is designed as a stiffening element or is integrally formed with the stiffening element. Thus, namely the ultrasonic sensor is particularly well shielded precisely in the place where it gives off most ultrasound, i.e. between the sensor housing and the membrane.

Particularly preferably it is envisaged that the stiffening element and the holder are designed to be integrally formed from a uniform material. The advantage of this embodiment consists in the further reduction of the vibration of the trim element by an overall larger amount of stiffening material. The additional accumulation of material has an vibration attenuating effect so that the vibrations can reliably be kept local.

Preferably, the stiffening element is designed to be ring-shaped. It preferably has a central through-hole, through which the membrane in the mounted state or in the assembled state extends, so that the stiffening element is arranged around the membrane and thus circumferentially around the outer circumference.

Preferably the common or uniform material from which the stiffening element and the holder are integrally formed is a ceramic material or ceramic. Thereby a particularly good stiffening is possible so that, on the one hand, the vibrating portion of the trim element can be effectively limited and, on the other hand, also the echo be minimized.

In one embodiment the holder comprises a receiving duct, in which the sensor housing is received by a back side of the holder opposite the stiffening element. Such a receiving duct has the particular advantage that thus the sensor housing at least partly is encompassed by the holder, whereby the vibration of the sensor housing and thus the echo are reduced.

The receiving duct preferably is designed to be cylindrical. Thus, the receiving duct can be adapted to the form of the sensor housing. Moreover, in this way an at least partial encompassing of the sensor housing by the receiving duct and thus an effective stiffening are realized. In this connection in particular the hollow space of the receiving duct is axially immediately adjacent to the through-hole of the stiffening element so that the hollow space of the receiving duct forms a joint axially extending space with the through-hole, in which the ultrasonic sensor is placed.

Between a stiffening element and the membrane, and thus in a radial slot between the stiffening element and the membrane, a decoupling ring made from a soft elastic material may be arranged. Thus, the membrane is decoupled from other components in terms of vibration. This decoupling ring in this connection is in particular in direct circumferential contact with an outer circumference of the pot-shaped membrane.

Preferably the ultrasonic sensor device additionally comprises a cap-like cover, which for fixing the sensor housing in the holder is capable of being put on this holder from a back side opposite the stiffening element. Thus, on the one hand a particularly reliable, safe to operate, and slip-proof fastening of the ultrasonic sensor in the holder is ensured, because the cover prevents release of the ultrasonic sensor from the holder. On the other hand, thus the portion of the ultrasonic signals emitted backwards can be further reduced. Moreover, thus also a particularly simple demounting and an easy exchange of the ultrasonic sensor is facilitated in that for instance the cover is released from the holder and the ultrasonic sensor is removed without much effort from the receiving duct.

Preferably the cover is capable of being connected with the holder via latch-in means. Thus a safe to operate connection is provided, which moreover can particularly fast be released again. In this way also a reversibly releasable connection between the cover and the holder is created. This embodiment also has the advantage that possibly a special connection technology between the ultrasonic sensor and the holder can be done without, because the ultrasonic sensor can be jammed into the receiving duct by the cover.

A particularly fast connection between the cover and the holder which is thus particularly secure for operation of the motor vehicle can be achieved by the fact that the latch-in means exhibit a groove formed in the circumferential direction, on the one hand, as well as a fin extending in the circumferential direction, on the other hand, which is capable of being latched into the complementary groove. Thus, a ring-shaped snap-in connection is realized, which ensures a firmly fixed connection and thus a reliable holding of the ultrasonic sensor during operation of the vehicle.

It is turns out to be advantageous if between a bottom of the cover and a back side of the sensor housing which faces away from the membrane an attenuation disk made from a soft elastic material, namely for instance from a silicone-like material, is arranged. By such an attenuation disk on the whole two effects are achieved: On the one hand, thus the sound propagation towards the back is minimized; on the other hand, the attenuation disk also allows for provision of a spring force, pre-stressed with which the ultrasonic sensor is arranged within the holder. Thus, a particularly good contact of the front side of the membrane with the trim element is ensured.

Preferably a front side of the attenuation disk facing the sensor housing comprises a sound reduction structure, by which the ultrasound is attenuated. Such a structure can be designed as a knob structure with a plurality of knobs facing in the direction of the ultrasonic sensor. The knobs can be designed to be conical and to each exhibit a tip, which contacts the back side of the ultrasonic sensor. Thus, the sound propagation towards the back is minimal and moreover a good spring force is created, which acts upon the back side of the ultrasonic sensor.

The cover can also comprise a radial recess for a plug of the ultrasonic sensor. Thus, the ultrasonic sensor can be electrically coupled with an electronic control device via the plug.

The cover can for instance be formed from plastic. However, alternatively it may also be formed from the same material from which the holder and the stiffening element are formed. Thus, the stiffening effect is further improved.

An arrangement according to the invention for a motor vehicle comprises a trim element, for instance a bumper, as well as an ultrasonic sensor device according to the invention, wherein a front side of the membrane and a front side of the stiffening element are brought into contact with the back side of the trim element so that the ultrasonic sensor emits and/or receives the ultrasonic signals through the material of the trim element.

A motor vehicle according to the invention, in particular a passenger car, comprises an arrangement according to the invention. The back side of the trim element is the side which faces the interior of the vehicle and thus is invisible from the outside.

A method according to the invention is configured for manufacturing an ultrasonic sensor device for a motor vehicle. An ultrasonic sensor with a pot-shaped membrane and a sensor housing is provided, as well as a stiffening element with a through-hole for the membrane as well as a holder for holding the sensor housing on a back side of a trim element of the vehicle. The stiffening element and the holder are integrally formed from the same material, namely in particular from ceramic.

The preferred embodiments presented with regard to the ultrasonic sensor device according to the invention apply in analogy to the arrangement according to the invention, the motor vehicle according to the invention, as well as the method according to the invention.

Further features of the invention derive from the claims, the figures, and the description of the figures. All features and feature combinations previously named in the description as well as the features and feature combinations named in the following in the description of the figures and/or in the figures alone are not only employable in the respectively indicated combination, but also in other combinations or else taken alone.

The invention is now set out in more detail by reference to a preferred embodiment, as well as by reference to the enclosed drawings.

It is shown in:

FIG. 1 a schematic exploded view of an ultrasonic sensor device according to an embodiment of the invention;

FIG. 2 a schematic view of the ultrasonic sensor device in the assembled state;

FIG. 3 a schematic and perspective view of a stiffening element and a holder, which are integrally formed with each other from ceramic; and FIG. 4 a schematic sectional view of the ultrasonic sensor device.

An ultrasonic sensor device 1 shown in a schematic and perspective exploded view in FIG. 1 comprises a stiffening part 2, which is integrally and fully formed from ceramic and thus is a ceramic full body. The stiffening part 2 consists of a ring-shaped and sheet-like stiffening element 3, on the one hand, as well as an axially adjacent holder 4, on the other hand. The stiffening element 3 has a through-hole 5, through which a pot-shaped membrane 6 of an ultrasonic sensor 7 extends in the assembled state, in order to be capable of contacting the back side of a trim element, such as a bumper of a motor vehicle.

The holder 4 is designed in the form of a receiving duct 8, which is designed to be cylindrical and arranged concentrically with a stiffening element 3. The receiving duct 8 in this connection has a smaller diameter than the stiffening element 3. The receiving duct 8 on a back side 9 of the stiffening element 3 opposite the named trim element of the vehicle protrudes therefrom in the axial direction so that the receiving duct 8 extends in the axial direction and in the assembled state faces in the direction towards the interior of the vehicle.

The ultrasonic sensor 7 has a sensor housing 10, from which the pot-shaped membrane 6 protrudes so that a front side 11 of the membrane 6 faces away from the sensor housing 10. The membrane 6 serves for emitting and receiving ultrasonic signals which are emitted and received through the named trim element.

The sensor housing 10 also exhibits a plug 12, which protrudes radially outward from a cylindrical part of the sensor housing 10. The plug 12 serves for connecting the ultrasonic sensor 7 with an electronic control device of the motor vehicle.

On the sensor housing 10 two guide elements 13, 14 are moulded in the form of lugs, which can be shiftably supported in corresponding guide grooves 15, 16 (FIG. 3) of the holder 4 or the receiving duct 8, and this in the axial direction. This means that the guide elements 13, 14 can be introduced or inserted into the complementary guide grooves 15, 16 and thus into the sensor housing 10 in the cylindrical receiving duct 8.

Possibly, these guide grooves 15, 16 can also be designed to include additional latch-in openings for the guide elements 13, 14 so that a latch-in connection between the ultrasonic sensor 7 and the holder 4 is facilitated. In the embodiment, however, it is done without such a catch mechanism.

With further reference to FIG. 1 the ultrasonic sensor device 1 namely further comprises a cover 17, which is designed to be cap-shaped, and a cylindrical coat 18 as well as a bottom 19, which closes the cover 17 from its axial front face and back side. On the other axial front face and front side the cover 17 is designed to be open. In the coat 18 moreover a radial recess 20 for the plug 12 of the ultrasonic sensor 7 is formed. Thus, the plug 12 can extend through this recess 20.

The interior diameter of the cover 17 corresponds essentially to the outer diameter of the receiving duct 8 or is a little larger than this outer diameter. Thus, the cover 17 can be put on or placed upon the receiving duct 8 from the back side opposite the stiffening element 3. The fastening of the cover 17 on the receiving duct 8 is effected via latch-in means 21, which exhibit a longitudinal groove 22 formed on an inner circumference of the cover 17 and extending in the circumferential direction as well as a fin 23 formed on the outer circumference of the receiving duct 8 and equally extending in the circumferential direction. The fin 23 in this connection can latch into the corresponding groove 22, wherein this latch-in connection can be released again by pulling the cover 17. In the mounted state thus the cover 17 encompasses the receiving duct 8 on its outer circumference or contacts its outer circumference. In other words, the cover 17 then is arranged around the receiving duct 8.

Optionally, the ultrasonic sensor device 1 also comprises an attenuation disk 24, which is of a circular design. A back side 25 of the attenuation disk 24 is designed to be even and smooth so that this back side 25 with its complete surface can be brought into contact with the bottom 19 of the cover 17. A front side 26, by contrast, has a sound reduction structure 27, which is designed as a knob structure with a plurality of cylindrical and regularly distributed knobs 28 that are arranged in a common plane and are equidistantly spaced apart from each other. The knobs 28 face in the direction of the ultrasonic sensor 7.

Further, the device 1 comprises a decoupling ring 29, which in the assembled state is arranged between the membrane 6 and the stiffening element 3.

FIG. 2 is a schematic view of the device 1 in the assembled state. As can be seen from FIG. 2, the front side 11 of the membrane 6 is flush with the front side 30 of the stiffening element 3 so that the two front sides 11, 30 on the whole represent a front side or face of the device 1. These front sides 11, 30 are brought into contact with the back side of the trim element, namely for instance via a glue.

FIG. 3 in a perspective view shows the stiffening part 2 in more detail, namely from its back side. The stiffening element 3 has an even back side 9, from which the receiving duct 8 of the holder 4 protrudes perpendicularly in the axial direction. The fin 23 in this set-up is positioned in the immediate vicinity of the stiffening element 3 and at a larger distance from an axial front face 31 of the receiving duct 8. As may be gathered from FIG. 3, the receiving duct 8 has two radial recesses 32, 33, which are formed on opposite sides. One of the recesses 32, 33 serves for receiving the plug 12, the other one for receiving a portion of the sensor housing 10 of the ultrasonic sensor 7.

The guide grooves 15, 16 are formed on an inner circumference 34 of the receiving duct 8 and extend in the axial direction. Into these guide grooves 15, 16 or indentations in the inner circumference 34 the guide elements 13, 14 of the ultrasonic sensor 7 can be inserted and thus the sensor housing 10 be introduced into the receiving duct 8.

In other words, the stiffening element 3 forms a base of the entire stiffening part 2, which in comparison with the receiving duct 8 or the holder 4 has a smaller axial length, but a larger diameter.

FIG. 4 shows a sectional view of the ultrasonic sensor device 1 in more detail. As may be gathered from FIG. 4, the tips of the knobs 28 of the attenuation disk 24 contact a back side 35 of the sensor housing 10 so that the ultrasonic sensor 7 under a spring force is clamped between the cover 17 and the holder 4. The guide elements 13, 14 in this connection are positioned in the guide grooves 15, 16. The ultrasonic sensor 7 also bears against an axial stop 36 of the stiffening element 3 in the axial direction.

Such a design of the stiffening part 2 as ceramic full body has the advantage that the sound pressure towards the back is clearly reduced in that the entire stiffening part 2 shields the ultrasonic sensor 7 where this reflects the ultrasound most, namely between the sensor housing 10 and the membrane 6. A further advantage is the improved reduction of the vibration of the trim element by an enlarged height of the stiffening part 2 due to the design of the stiffening element 3 being integrally formed with the holder 4 from ceramic. The optionally employed attenuation disk 24 reduces the echo to a minimum. The demounting of the ultrasonic sensor 7 is particularly simple: If the cover 17 is unlatched from the holder 4, the ultrasonic sensor 7 glued together with the trim element can be released from the adhesive spot by lifting at the plug 12, and subsequently can be glued again at the same place. The stiffening part 2 including the holder 4 and the stiffening element 3 here remains on the trim element. If, however, in a repair case also the entire stiffening part 2 needs to be released, it may also be envisaged that on the outer circumference of the stiffening element 3 a dihedron is injection-moulded upon, which facilitates the demounting of the stiffening part 2 with the aid of a ring wrench or a jaw spanner.

The invention claimed is:

1. An ultrasonic sensor device for a motor vehicle, comprising: an ultrasonic sensor, which comprises a pot-shaped membrane for emitting and/or receiving ultrasonic signals, and a sensor housing; a stiffening element arranged around the membrane; and a holder, which is designed for holding the sensor housing on a back side of a trim element of a motor vehicle, wherein the stiffening element and the holder are integrally formed from ceramic.

2. The ultrasonic sensor device according to claim 1, wherein the holder comprises a receiving duct in which the sensor housing is received by a back side opposite the stiffening element.

3. The ultrasonic sensor device according to claim 2, wherein the receiving duct is of a cylindrical design.

4. The ultrasonic sensor device according to claim 1, wherein between the stiffening element and the membrane a decoupling ring made from a soft elastic material is arranged.

5. The ultrasonic sensor device according to claim 1, wherein the ultrasonic sensor device further comprises a cap-shaped cover, which is configured to be put on the holder from a back side opposite the stiffening element for fixing the sensor housing to the holder.

6. The ultrasonic sensor device according to claim 5, wherein the cover is configured to connect via latch-in means with the holder.

7. The ultrasonic sensor device according to claim 6, wherein the latch-in means comprise a groove formed in the circumferential direction, on the one hand, as well as a corresponding fin extending in the circumferential direction, on the other hand, which is configured to latch into the groove.

8. The ultrasonic sensor device according to claim 5, wherein between a bottom of the cover and a back side of the sensor housing facing away from the membrane an attenuation disk made from a soft elastic material is arranged.

9. The ultrasonic sensor device according to claim 8, wherein a front side of the attenuation disk facing the sensor housing comprises a sound reduction structure, in particular a knob structure.

10. The ultrasonic sensor device according to claim 5, wherein the cover comprises a radial recess for a plug of the ultrasonic sensor.

11. An arrangement for a motor vehicle, comprising a trim element and an ultrasonic sensor device according to claim 1, wherein a front side of the membrane and a front side of the stiffening element are brought into contact with the back side of the trim element so that the ultrasonic sensor is configured for emitting and/or receiving the ultrasonic signals through the trim element.

12. A motor vehicle comprising an arrangement according to claim 11.

13. The ultrasonic sensor device according to claim 1, wherein the ultrasonic sensor is in a covered arrangement.

14. The ultrasonic sensor device according to claim 1, wherein a front side of the membrane is configured to be in contact with the back side of a trim element of a motor vehicle.

15. A method for manufacturing an ultrasonic sensor device for a motor vehicle by providing an ultrasonic sensor with a pot-shaped membrane for emitting and/or receiving ultrasonic signals and a sensor housing and by providing a stiffening element comprising a through-hole for the membrane as well as a holder for holding the sensor housing on a back side of a trim element of the motor vehicle, wherein the stiffening element and the holder are designed to be integrally formed from ceramic.

* * * * *